Aug. 5, 1958 R. C. ANDERSEN 2,845,988
MACHINE FOR CORRUGATING A TUBE AND COLLAPSING THE CORRUGATIONS
Filed Feb. 15, 1954 6 Sheets-Sheet 2
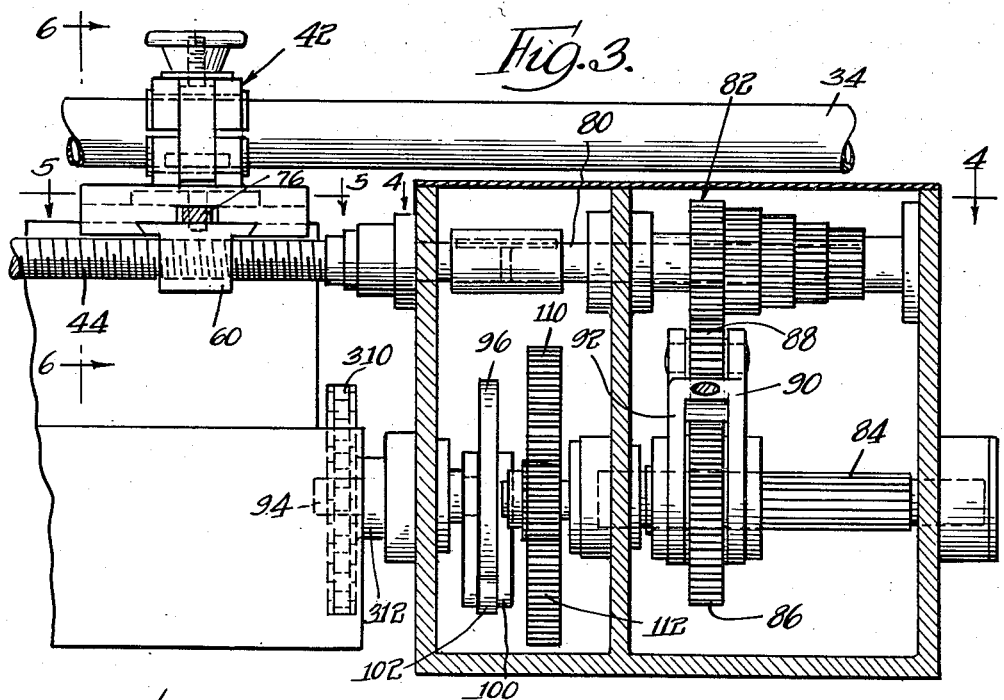
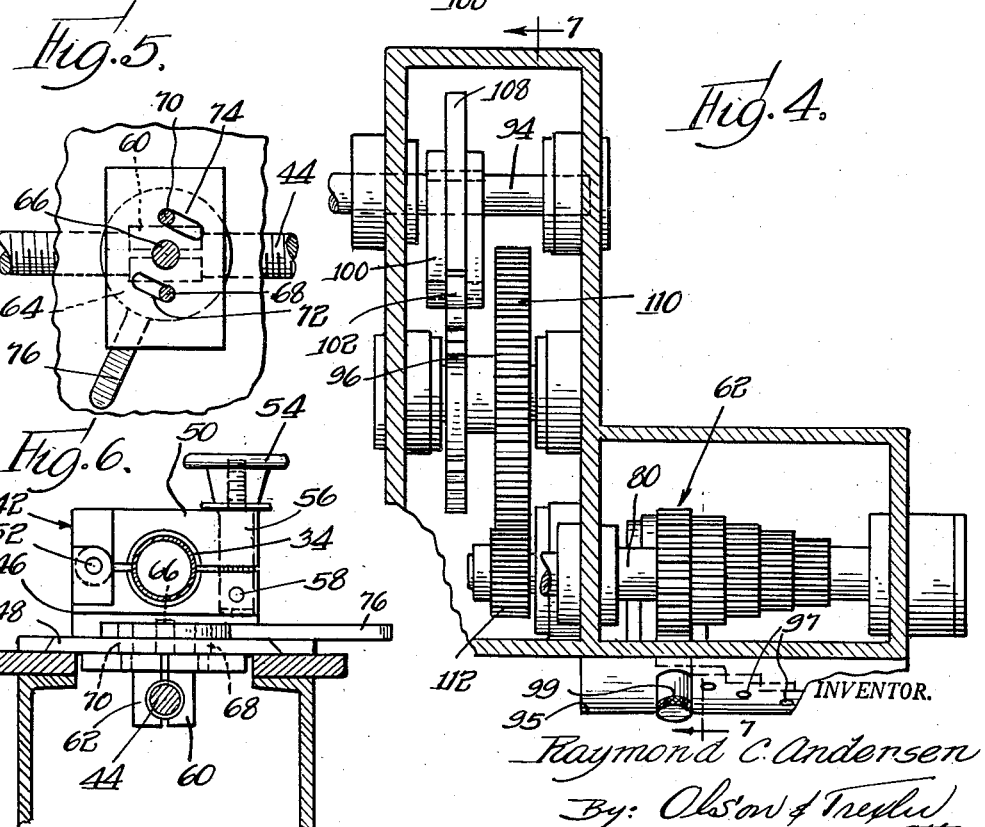
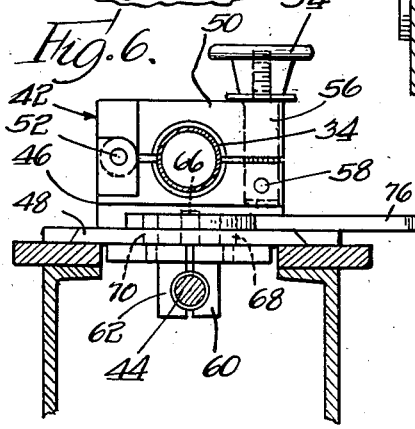
INVENTOR.
Raymond C. Andersen
By: Olson & Trexler
attys

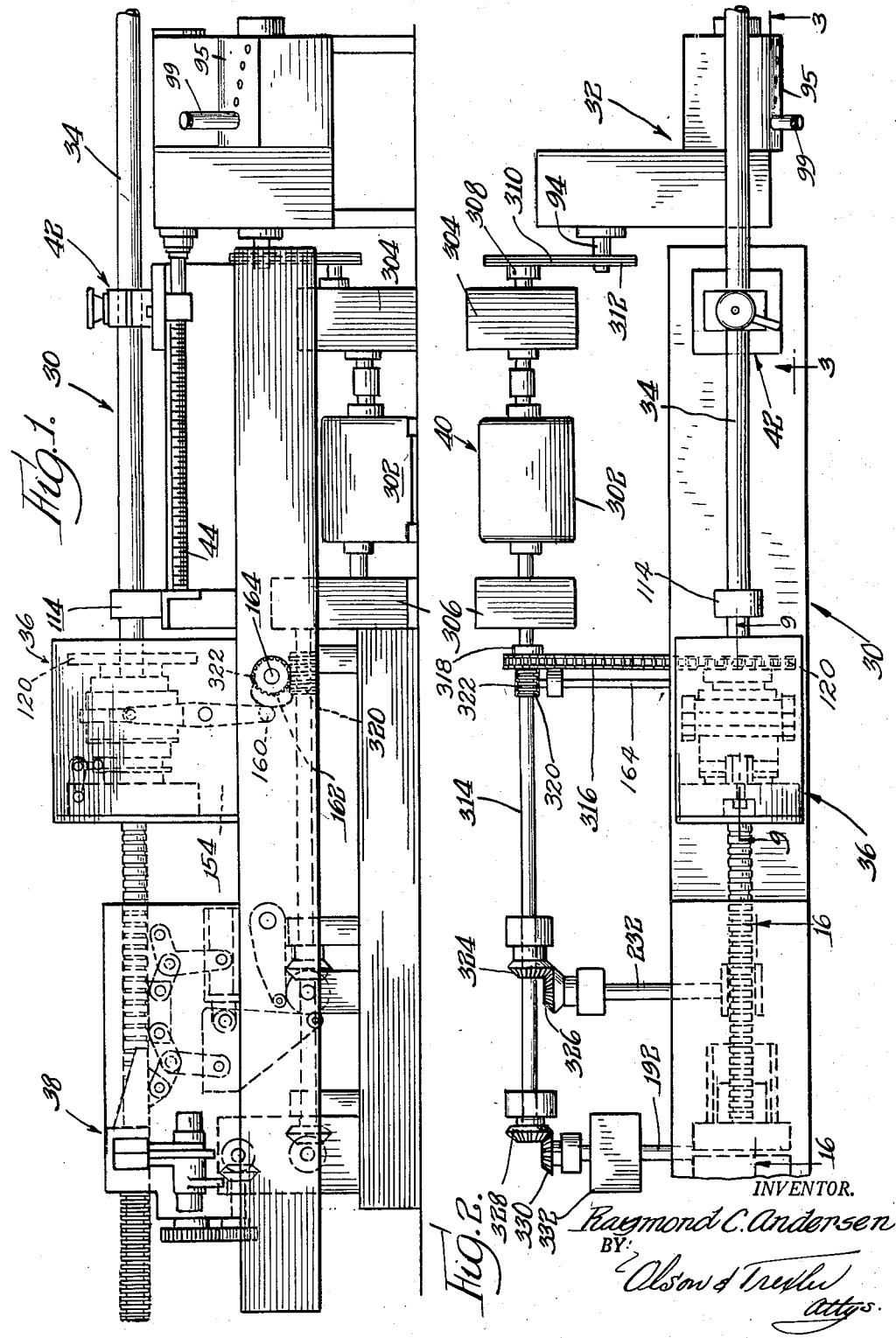

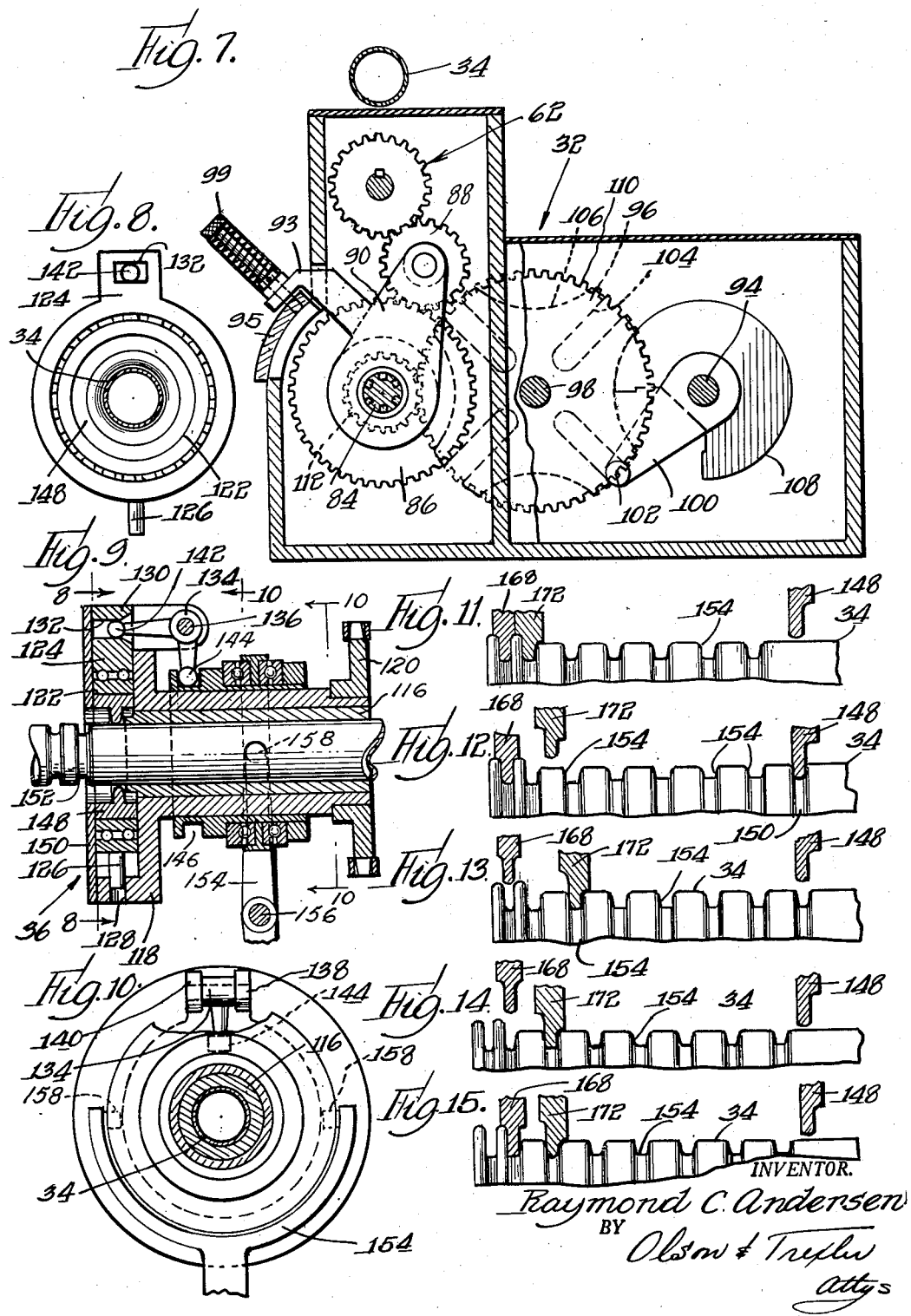

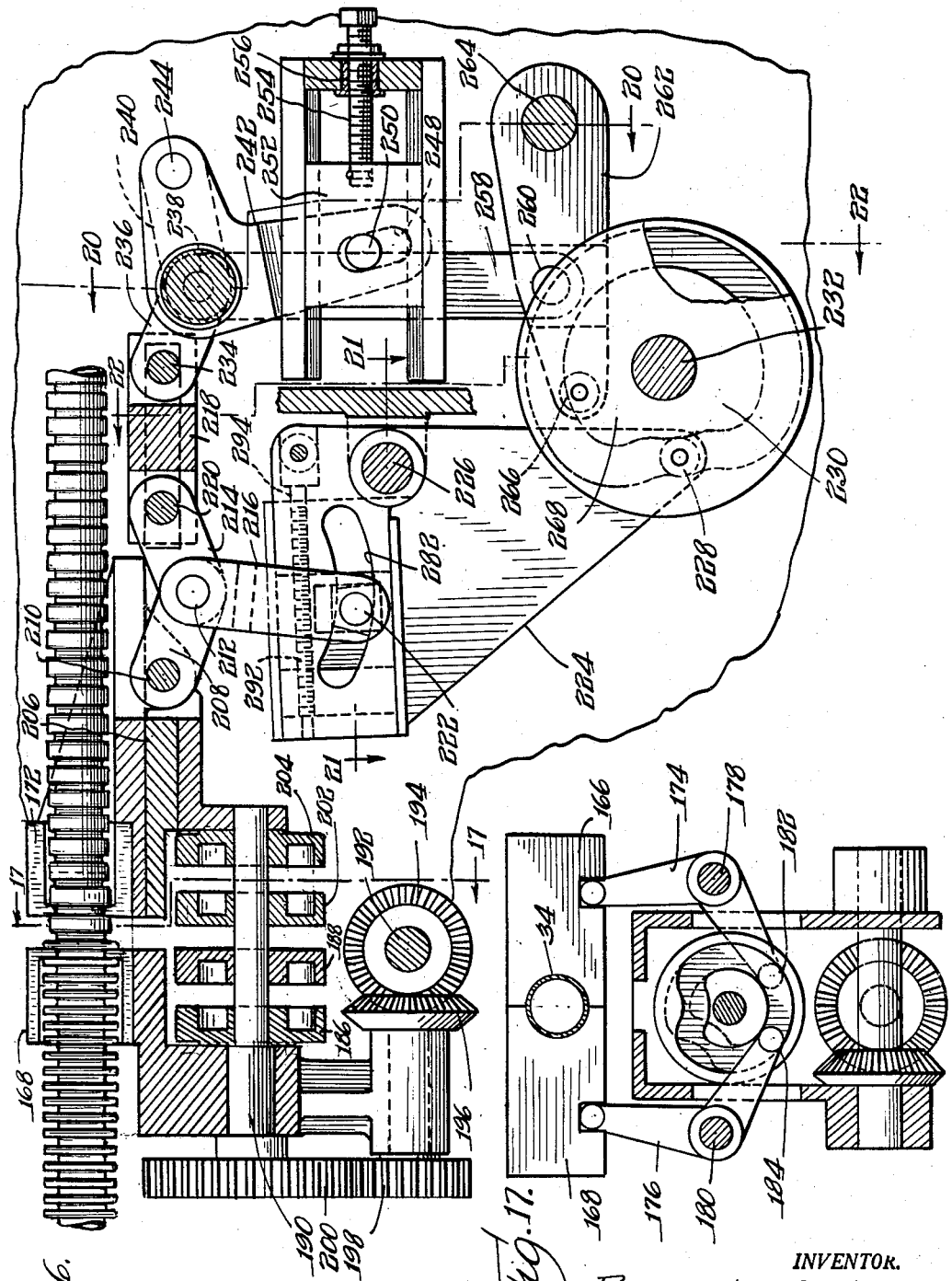

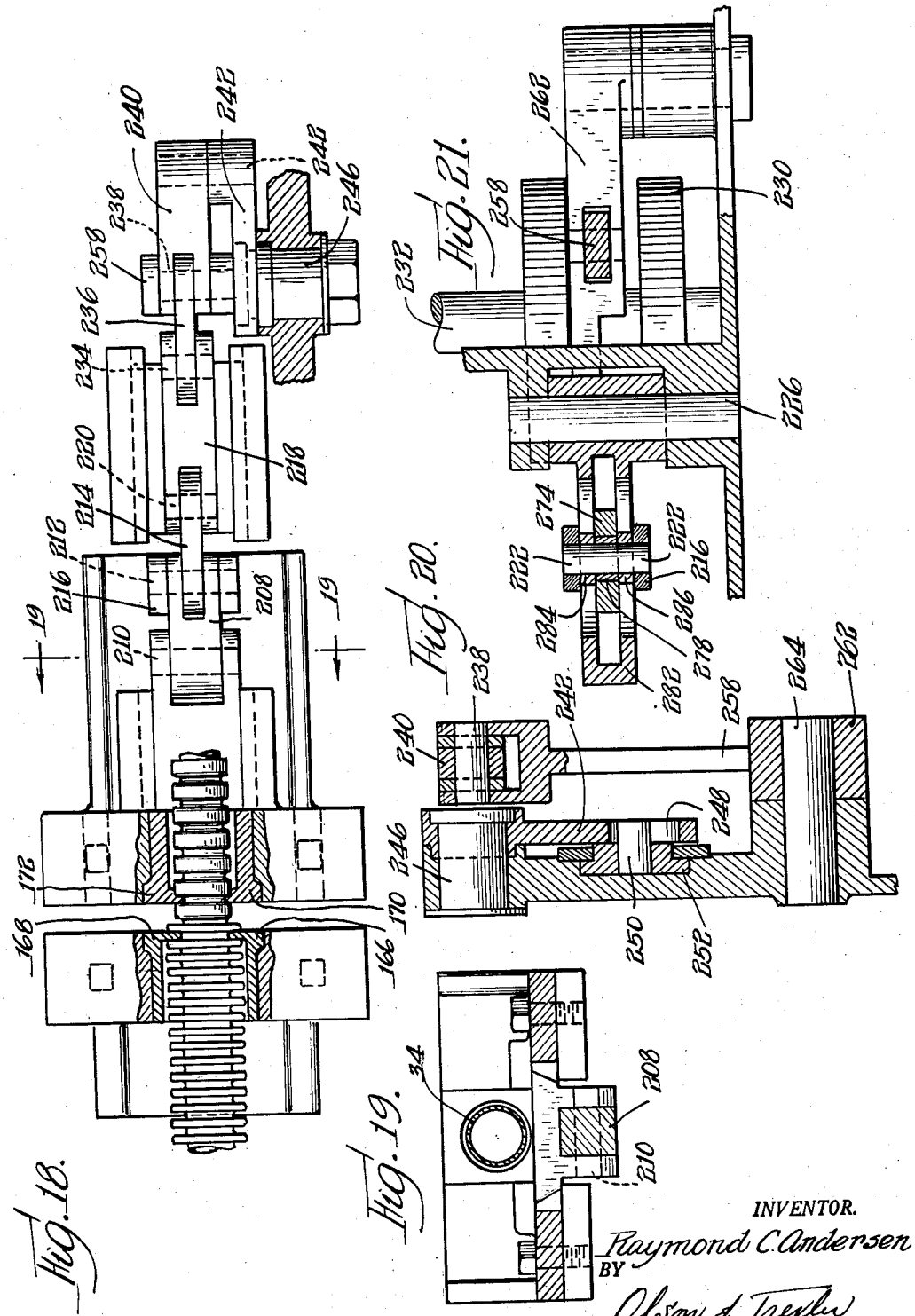

Aug. 5, 1958 R. C. ANDERSEN 2,845,988
MACHINE FOR CORRUGATING A TUBE AND COLLAPSING THE CORRUGATIONS
Filed Feb. 15, 1954 6 Sheets-Sheet 6

INVENTOR.
Raymond C. Andersen
BY Olson & Trexler
Attys.

United States Patent Office 2,845,988
Patented Aug. 5, 1958

2,845,988

MACHINE FOR CORRUGATING A TUBE AND COLLAPSING THE CORRUGATIONS

Raymond C. Andersen, Lombard, Ill., assignor to Flexonics Corporation, Maywood, Ill., a corporation of Illinois Application February 15, 1954, Serial No. 410,278

17 Claims. (Cl. 153—73)

The present invention relates to a novel apparatus for forming corrugated flexible tubing.

Corrugated flexible tubing has heretofore been produced by various methods from plain or smooth tubing. Of these methods, one of the most satisfactory has been a step by step process including the formation of annular grooves at predetermined spaced intervals along the plain tubing and subsequently collapsing or compressing the tubing axially between the grooves to provide relatively deep and sharp corrugations.

While the apparatus heretofore used to carry out the above mentioned step by step method of forming corrugated tubing has in general been satisfactory, several problems have been presented and the present invention contemplates the solution of at least some of these problems. For example, it is necessary to feed the tubing step by step in predetermined increments to suitable means for forming annular grooves therein. Since the inside and outside diameters of the finished corrrugated tubing depend to a considerable extent upon the spacing between the annular grooves, it is necessary that this spacing be precise and it is desirable that the spacing be readily adjustable so that corrugated tubing of various inside and outside diameters may be formed. With the apparatus heretofore in use, errors in the spacing sometimes occurred due to a tendency of the apparatus to overfeed the tubing and because of difficulty in properly adjusting the apparatus. Furthermore, with the apparatus heretofore in use, the length of each step by step feeding movement of tubing could not readily be adjusted in fine increments.

After the tubing has been provided with a series of annular grooves, it is directed to means for compressing or collapsing the tubing between the grooves and for feeding the tubing. This means in the apparatus heretofore in use includes two sets of expandable gripping rings with one of the rings being fixed against axial movement while the other ring is reciprocably mounted. Means is provided for reciprocating the last mentioned ring so that during a portion of the stroke, the ring grips and feeds the tubing, and during another portion of the stroke, the tubing is collapsed. Since the precise inner and outer diameters of the finished corrugated tubing also depend upon the lengths of the feeding and collpsing portions of the gripping ring stroke, it is desirable that the length of the stroke be adjustable. However, with the apparatus heretofore used, it has not been possible to adjust the length of either of these stroke portions without disturbing the other stroke portion.

An object of the present invention is to provide a novel apparatus for producing corrugated tubing by the step by step method generally set forth above, which novel apparatus is capable of forming tubing rapidly and accurately and which apparatus may be relatively easily adjusted to form various sizes of the tubing differing from one another by a relatively small degree.

Another object of the present invention is to provide a novel apparatus of the type mentioned above which is capable of advancing tubing in precise increments of predetermined length to the means for forming annular grooves therein.

A more specific object of the present invention is to provide a novel apparatus of the above described general type wherein the length of each step by step advancement of the tubing to the annular groove forming means may be easily adjusted in relatively small increments.

A further object of the present invention is to provide a novel apparatus of the above described general type with tube feeding and collapsing means constructed so that the feeding and collapsing operations may be individually adjusted.

A more specific object of the present invention is to provide a novel apparatus as set forth in the preceding paragraph which is capable of relatively high speed operation to facilitate economical production of the tubing.

Other objects and advantages of the present invention will become apparent in the following description and the accompanying drawings wherein:

Fig. 1 is a somewhat schematic side elevational view illustrating an apparatus embodying the principles of this invention;

Fig. 2 is a plan view of the apparatus shown in Fig. 1;

Fig. 3 is an enlarged vertical cross-sectional view taken along line 3—3 in Fig. 2;

Fig. 4 is a fragmentary cross-sectional view taken along line 4—4 in Fig. 3;

Fig. 5 is a fragmentary cross-sectional view taken along line 5—5 in Fig. 3;

Fig. 6 is a fragmentary cross-sectional view taken along line 6—6 in Fig. 3;

Fig. 7 is a fragmentary cross-sectional view taken along line 7—7 in Fig. 4;

Fig. 8 is a cross-sectional view taken along line 8—8 in Fig. 9;

Fig. 9 is an enlarged fragmentary cross-sectional view taken along line 9—9 in Fig. 2;

Fig. 10 is a cross-sectional view taken along line 10—10 in Fig. 9;

Figs. 11 through 15 are schematic views illustrating the operation of a portion of the apparatus;

Fig. 16 is an enlarged fragmentary cross-sectional view taken along line 16—16 in Fig. 2;

Fig. 17 is a fragmentary cross-sectional view taken along line 17—17 in Fig. 16;

Fig. 18 is a fragmentary plan view partially broken away of the portion of apparatus shown in Fig. 16;

Fig. 19 is a fragmentary cross-sectional view taken along line 19—19 in Fig. 18;

Fig. 20 is a fragmentary cross-sectional view taken along line 20—20 in Fig. 16;

Fig. 21 is a fragmentary cross-sectional view taken along line 21—21 in Fig. 16;

Figure 22:
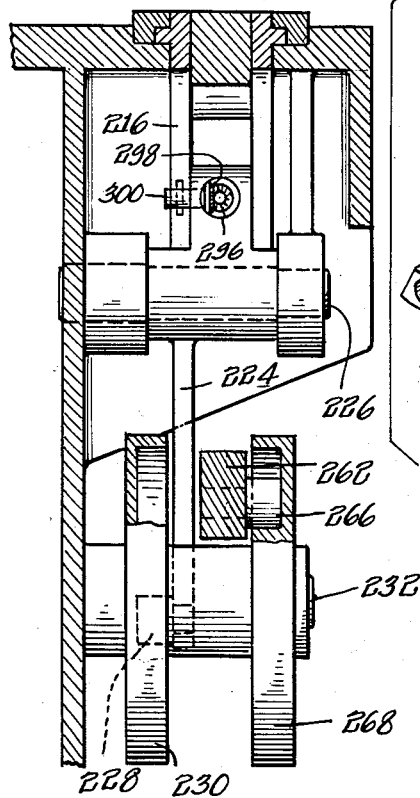
Fig. 22 is a fragmentary cross-sectional view taken along line 22—22 in Fig. 16.

Referring now more specifically to the drawings wherein like parts are designated by the same numerals throughout the various figures, an apparatus 30 embodying the principles of this invention is illustrated in Figs. 1 and 2. This apparatus in general includes means 32 for feeding smooth or plain tubing 34 step by step in predetermined increments, means 36 for forming annular grooves in the tubing, means 38 for feeding and collapsing the partially corrugated tubing to form the finished product and drive means 40 for driving the various tube feeding and forming means in timed relationship with each other.

The tube feeding means 32 includes a clamp 42 adapted to grip the tubing and also adapted to be advanced by a feed screw 44 suitably rotatably mounted. Referring particularly to Figs. 3, 5 and 6, it is seen that the clamp 42 includes a fixed jaw member 46 mounted on a base 48 and having a movable jaw member 50 pivoted thereto by means including a pin 52. The movable jaw is releasably locked in tube gripping position by means of a knob 54 that is threaded onto the end of a lever 56 pivotally connected to the fixed jaw member by pin 58. Means is provided for detachably interconnecting the clamp with the feed screw whereby the clamp may be disconnected from the screw and moved from an advanced position to a rearward starting position rapidly and without driving the feed screw in a reverse direction. In the illustrated embodiment this is accomplished by slidably mounting a pair of cooperating nut sections 60 and 62 on the base member 48, which nut sections are movable into and out of engagement with the feed screw. This is accomplished by rotatably mounting a cam member 64 on the base with a centrally located pin 66 and providing the nut sections respectively with upstanding pins 68 and 70 which extend into cam slots 72 and 74 in the cam member. The cam member is provided with a handle 76 so that it may be quickly and easily rotated to move the nut sections either into or out of engagement with the feed screw.

In accordance with the present invention, the feeding means 32 is constructed so that the feed screw 44 may be positively and accurately rotated so that the clamp 42, and thus the tubing, is advanced in increments of substantially any predetermined amount. In order to accomplish this result, the feed screw 44 is connected by means of a coupling 78 to a shaft 80 having a gear set 82 fixed thereon. The gear set is driven from a shaft 84 through a relatively large gear 86 mounted on the shaft and an adler gear 88 carried between arms 90 and 92 which are freely supported on the hub of the gear 86. The gear 86 is adjustable axially of the shaft 84 so as to position the idler gear for meshing engagement with any one of the various gears of the gear 82. Any suitable means may be provided for shifting gears 86 and 88 and, in the particular embodiment illustrated, this means includes an arm 93 extending outwardly from the arms 90 and 92, which arm has a free end overlying a fixed plate 95 provided with a plurality of apertures 97. A spring biased plunger 99 is carried on the free end of the arm 93 and is adapted to be selectively positioned in one of the apertures 97 to lock the gears 86 and 88 in the desired adjusted position. This arrangement enables the length of each intermittent feeding movement of the feed screw and clamp to be precisely adjusted and the operator of the apparatus can easily determine what this length is going to be merely by observing which section of the gear set 82 is meshing with the idler gear 88. The length of this feeding movement may be changed relatively small amounts by only slightly varying the size of the different sections of the gear set. In addition, a further adjustment may be easily obtained merely by replacing the gear set 82 with another of a different size.

The feeding means 32 is provided with an input shaft 94 which is continuously driven by means described fully hereinbelow. In order to prevent the feed screw from being either over or underdriven, means is provided for positively driving the shaft 84 from the input shaft 94 and also for positively stopping and locking the shaft 84 at predetermined intervals. This means includes a Geneva motion drive mechanism having a disk 96 fixed to a rotatably supported stub shaft 98 and a driving arm 100 fixed on the shaft 94. The driving arm 100 is provided with a pin 102 adapted to enter radially extending slots 104 in the disk 96. In addition to the slots, the disk 96 is provided with peripheral recesses 106 which are adapted to receive a locking disk 108 fixed on the input shaft 94. The operation of a Geneva drive is well known and, therefore, need not be specifically set forth. It is understood that the shaft 98 will be positively driven a predetermined amount and then positively locked and this positive intermittent motion is transferred to the shaft 84 by means of a gear 110 mounted on the stub shaft 98 and a small gear 112 mounted on the shaft 84.

As mentioned above, the smooth tubing 34 is intermittently fed by the feeding means 32 to the grooving means 36. Preferably, a bearing member 114 is provided adjacent the grooving means 36 for slidably supporting the tubing. The grooving means 36, which is shown best in Figs. 1, 2, 8, 9 and 10 includes a fixed bushing 116 supported in any suitable manner for slidably receiving the tubing. A head member 118 is rotatably mounted on the fixed bushing 116 and means such as a sprocket wheel 120 is keyed or otherwise fixed on the head member for driving the head member. Associated with the head member is a ball bearing having an inner race 122 and outer race 124. The outer race carries a pin 126 radially slidably extending into an aperture 128 in the rotatable head and, in addition, the outer race is provided with a radially projecting lug 130 having a recess 132 therein. A bell crank 134 is pivotally mounted by means of a pin 136 between spaced lugs 138 and 140 on the rotatable head. One end 142 of the bell crank extends into the recess 132 and the opposite end 144 of the bell crank extends within a grooved collar 146 freely disposed on the hub of the rotatable head. A pressure ring 148 is disposed within the inner ball bearing race 122 and the ball bearing means and pressure ring are retained in an assembled relationship with the rotatable head by means of a cover plate 150.

In order to form grooves in the tubing, the head 118 is rotated while the pressure ring 148 remains relatively substantially stationary and, at the same time, the bell crank is operated so that the ball bearing means and pressure ring are moved to an eccentric position in order to apply a rolling pressure to the tubing. The manner in which the tubing 34 is provided with annular grooves 152 by the apparatus just described is well known and need not be set forth in detail. It suffices to say that suitable means is provided for actuating the bell crank in proper timed relationship with the intermittent feeding motion of the tubing and, in the particular embodiment illustrated, this means includes a lever 154, suitably pivotally mounted as at 156. One end of the lever is disposed for cooperation with pins 158 mounted between bearing assemblies disposed within the collar 146 and the opposite end 160 of the lever engages an actuating cam 162 mounted on a drive shaft 164. This drive shaft is in turn driven by the means described fully hereinbelow.

The tubing having a series of annular grooves 154 formed therein is advanced to the feeding and collapsing means 38. This means includes a pair of gripping dies 166 and 168 which are mounted for movement toward and away from each other. In addition, a second pair of dies 170 and 172 are provided and these dies are mounted for movement not only toward and away from each other but also for movement axially of the tubing. In order to open and close these dies, the means shown best in Figs. 1, 2, 16 and 17 is provided. This means includes a pair of bell cranks 174 and 176 respectively pivotally mounted at 178 and 180. One end of the bell crank 174 is operatively connected to the die 166 and one end of the bell crank 176 is similarly connected to the die 168. The opposite ends of the bell cranks respectively carry rollers 182 and 184 which extend into suitably shaped cam grooves in cam members 186 and 188. The cam members are keyed or otherwise fixed on a shaft 190, which shaft is driven from a shaft 192 through bevel gears 194 and 196 and spur gears 198 and 200. A second pair of cam members 202 and 204 are mounted on the shaft 190 for operating bell cranks substantially identical to the bell cranks 174 and 176 and operatively connected to the dies 170 and 172. With this structure, it is seen that both pairs of dies may be positively opened and closed in predetermined timed relationship.

In accordance with the present invention, novel means is provided for actuating the dies 170 and 172 in timed relationship with the dies 166 and 168 and the pressure ring 148. The method of operation is generally illustrated in Figs. 11 through 15. Starting at Fig. 11, the parts are shown in the positions they assume at the end of the tube collapsing movement of the dies 170 and 172. At the end of the collapsing operation, the dies 166 and 168 continue to grip the tubing to hold it against axial movement while the dies 170 and 172 open and move rearwardly, as shown in Fig. 12, until they come into alignment with the next groove 154. At the same time, the pressure ring 148 is actuated to form another groove in the tubing. When the dies 170 and 172 reach their rearmost position, they are closed to grip the tubing, as shown in Fig. 13, and the dies 166 and 168 and the pressure ring 148 are subsequently withdrawn from the tubing. Then the dies 170 and 172 are advanced to feed the tubing until the dies 166 and 168 come into registration with a succeeding groove, as shown in Fig. 14, whereupon the dies 76 and 78 are closed, as shown in Fig. 15. Further axial movement of the dies 170 and 172 from the position shown in Fig. 15 to the position shown in Fig. 11 causes collapsing of the portion of tubing between the two pairs of dies and also advances the tubing through the pressure ring 148. As will appear from the description given hereinbelow, the feeding means 32 is disconnected from the tubing after a sufficient length of tubing having annular grooves is provided to extend between the dies 170 and 172. The dies 170 and 172 thereafter take over the function of feeding the tubing as well as that of collapsing the tubing. Thus, it is seen that the length of the axial stroke of the dies 170 and 172 controls the spacing between the grooves 154. As just described above, the overall length of this stroke is divided into a tubing feeding portion and a combined tubing collapsing and feeding portion. In accordance with the present invention, novel means has been provided for adjusting these two stroke portions independently of one another so that the apparatus may be adjusted relatively easily to produce corrugated tubing having various inside and outside diameters.

Figure 23:
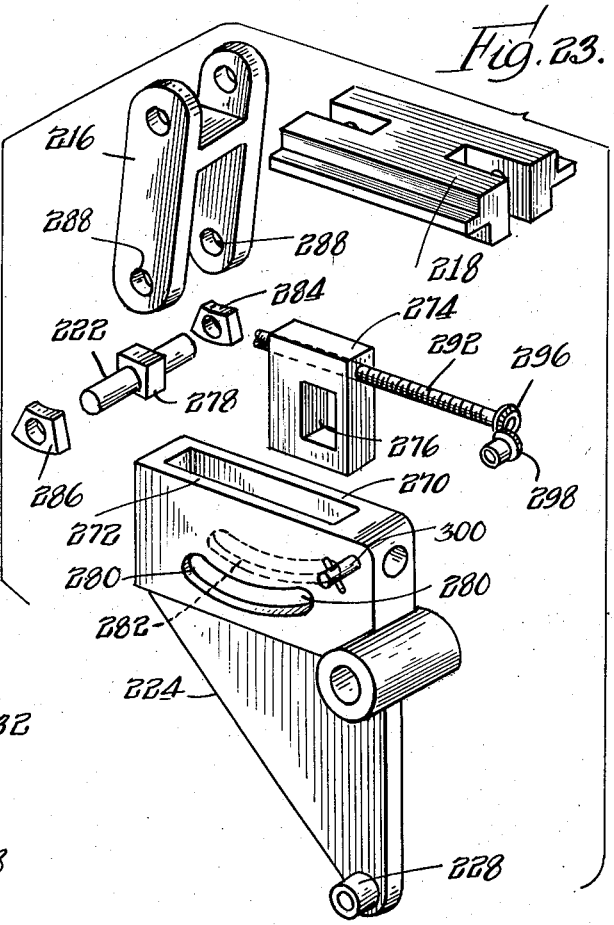
Fig. 23 is an exploded perspective view illustrating a portion of the feeding and collapsing ring actuating mechanism.
Figure 24:
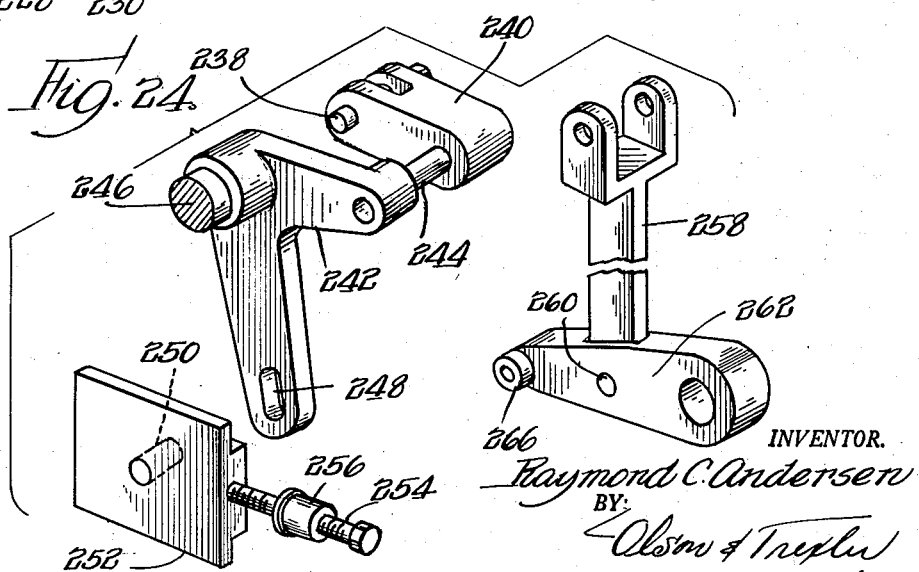
Fig. 24 is an exploded perspective view illustrating another portion of the feeding and collapsing ring actuating mechanism.

The novel means for reciprocating the dies 170 and 172 axially of the tubing is illustrated in Figs. 1, 2, 16, and 18 through 24. This means includes a slide member 206 supporting the dies 170 and 172 for movement axially of the tubing. A link 208 is pivotally connected to the slide member by means of a pin 210 and the opposite end of this link is pivotally connected by means of a pin 212 to a pair of links 214 and 216. The opposite end of the link 214 is connected to a second slide member 218 which will be referred to in more detail below by means of a pin 220. The opposite end of the link 216 is pivotally connected by means including a pin 222 to a lever member 224 which is pivotally mounted by means of a pin 226. The member 224 carries a roller 228 which extends into a cam groove of a cam member 230 keyed to a drive shaft 232. With this structure, it is seen that upon movement of the member 224 in a clockwise direction, as viewed in Fig. 16, the link 216 will be raised and the links 208 and 214 will be operated to advance the slide member 206. It should be noted that the cam 230 may be provided with the optimum shape for high speed operation since the height of the cam need only be relatively small in order to actuate the collapsing and feeding dies 170 and 172 through a portion of their stroke. Similarly, the cam described below for actuating these dies during the remainder of their stroke may be formed with the optimum shape for high speed operation. This shape is one in which the cam roller is initially raised slowly, then rapidly, and then slowly again.

The linkage mechanism described in the preceding paragraph is operable to advance the slide member 204 during the tubing feeding portion of the overall stroke. In accordance with the present invention, the slide member 206 is advanced during the tubing collapsing portion of the stroke by other linkage means including the above mentioned slide member 218. This slide member is pivotally connected by means of a pin 234 to a link 236 which in turn is connected by a pin 238 to a link 240. The opposite end of the link 240 is pivotally connected to one end of a bell crank 242 by means of a pin 244. The bell crank is pivotally supported on a stub shaft 246 and the opposite end of the bell crank is provided with an elongated slot 248 adapted to receive a pin 250 carried by an adjustably mounted block 252. In the particular embodiment illustrated, the block 252 is slidably supported in suitable guideways and may be adjusted by means of a screw 254 threaded therein and rotatably confined by a bushing 256. With this structure, it is seen that the bell crank 242 may be adjusted to change the position of the link supporting pin 244 for the purpose set forth below.

In order to actuate the links 236 and 240 and operate the slide 218, a connecting link 258 is provided between the pin 238 and a pin 260 carried by a lever 262. The lever 262 is pivotally mounted as at 264 and carries a roller 266 adapted to extend into a cam groove in a cam 268 fixed on the shaft 232.

It is often desirable to vary the overall length of the stroke of the dies 170 and 172 and to adjust the feeding portion and the combined collapsing and feeding portion of the stroke relative to one another. The combined collapsing and feeding portion of the stroke may be adjusted by rotating the bell crank 242 about a stub shaft 246. This, of course, may be accomplished by the slide block 252 and adjusting screw 254. By adjusting the bell crank 242 in a counterclockwise direction, as viewed in Fig. 16, the pin 244 will be raised and the link 240 positioned so that the length of the combined collapsing and feeding stroke will be increased. Conversely, the length of the combined collapsing and feeding stroke may be decreased by adjusting the bell crank in a clockwise direction. It should be noted that the link 240 and the bell crank are proportioned so that the pin 238 and the stub shaft 246 may be in axial alignment, as illustrated in Fig. 16. With the elements of the apparatus in the position shown in Fig. 16, the dies 170 and 172 are fully retracted to a predetermined starting position and are ready to begin the tubing feeding portion of the stroke. With the relationship between the link 240 and the bell crank, the bell crank may be pivoted to adjust the length of the collapsing and feeding stroke without changing the illustrated starting position of the pin 238 and the remainder of the mechanism including the dies 170 and 172. Thus, it is seen that the length of the collapsing and feeding portion of the stroke may be adjusted independently of the length of the feeding portion of the stroke.

In order to adjust the tubing feeding portion of the stroke of the dies, the link 216 is adjustably connected to the lever member 224. This structure is shown best in Figs. 16, 21, 22 and 23. The lever member 224 is provided with a hollow upper portion having spaced sides 270 and 272, and the link 216 is provided with a pair of legs adapted to straddle these spaced sides. A block 274 is slidably disposed between the sides 270 and 272 and the block is provided with a rectangular opening 276. The connecting pin 222 has fixed thereon a square block 278 which is adapted to slide up and down within the rectangular opening 276 and the opposite ends of the pin extend outwardly through arcuate slots 280 and 282 in the sides 270 and 272 respectively. Adjacent its opposite ends, the pin 222 carries slide blocks 284 and 286 which are slidably disposed within the arcuate slots, and the extremities of the pin enter into apertures 288 in the legs of the link 216. As will be understood, the length of the feeding stroke may be adjusted by varying the distance between the pin 222 and the pivot pin 226 of the lever member 224. Adjustment may be readily accomplished by moving the block 274 back and forth between the sides 270 and 272 of the lever member and, in order to move the block 274, an elongated screw member 292 is threaded therethrough. One end of the screw member passes through a bearing aperture 294 in the lever member and carries a small gear 296. The gear 296 meshes with another small gear 298 suitably supported in the lever member and the gear 298 may be turned by means of a key 300. It should be particularly noted that the radius of the slots 280 and 282 is such that the link 216 may be adjusted from one end of the slots to the other without raising or lowering the connecting pin 212. Thus, the feeding portion of the stroke may be adjusted without changing the starting point of the axially movable dies and without changing the length of the combined collapsing and feeding portion of the stroke. It is, of course, understood that the fixed dies 166 and 168 are preferably mounted by adjustable bolt means or the like, not shown, so that they may be adjusted axially to register properly with the grooves formed in accordance with the particular adjustment of the stroke of the movable dies. Furthermore, it should be understood that the entire feeding and collapsing mechanism 38 is preferably adjustably mounted by suitable means, not shown, so that it may be adjusted back and forth relative to the groove means 36.

The drive means 40 for operating the feeding means 32, the grooving means 36, and the collapsing and feeding means 38 in predetermined timed relationship with each other may be of any suitable construction. In the particular embodiment illustrated, the driving means 40 includes a motor 302 having opposite ends thereof operatively connected to variable speed drive mechanisms 304 and 306. The variable speed drive 304 has a sprocket wheel 308 mounted on the output shaft thereof and a chain 310 is wrapped around this sprocket wheel and a second sprocket wheel 312 fixed on the input shaft 94 of the feeding means 32. The output shaft of the variable speed drive 306 is connected to a shaft 314. The rotatable head of the grooving means 36 is driven from the shaft 314 by means of a chain 316 wrapped around the sprocket wheel 120 mounted on the head and a second sprocket wheel 318 mounted on the shaft. The shaft 164 carrying the grooving means actuating cam 162 is driven from the shaft 314 by suitable means such as a worm 320 and a gear 322. The shaft 314 also drives the shaft 232 carrying the collapsing and feeding dies actuating cams by means of a pair of beveled gears 324 and 326. In addition, the drive shaft 192 for operating the cam shaft 190 is driven from the shaft 314 through a pair of beveled gears 328 and 330. Furthermore, the speed of the shaft 192 may be reduced relative to the shaft 314 by providing a suitable worm drive 332.

The operation of the apparatus of this invention is adequately set forth hereinabove. However, a brief résumé of the operation is as follows. The feeding means 32 is, of course, first adjusted to advance the tubing in the desired increments. At the same time, the collapsing and feeding means 38 is adjusted so that the overall length of the axially movable die stroke is equal to the increments of tubing intermittently advanced by the feeding means 32. A length of smooth tubing 34 is then inserted through the bearing 114 and into the bushing 160 of the grooving means 36 and gripped by the clamp 42. The clamp has, of course, first been moved to the rearward position, shown in Figs. 1 and 2, and the nut sections have been brought into engagement with the feeding screw 44. The motor 302 is then energized and the tubing is intermittently advanced through the grooving means 36 in the manner more fully set forth hereinabove. By the time the clamp 42 has advanced to the end of the feed screw 44, the forward end of the tubing has been advanced to the collapsing and feeding means 38. Therefore, when the axially movable dies begin to grip and feed the tubing, the clamp 42 is operated to release the tubing and the nut sections are withdrawn from engagement with the feed screw 44. Thereafter, the entire tubing is fed through the apparatus by the axially movable dies.

From the above description, it is seen that the present invention has provided a novel apparatus for making corrugated tubing, which apparatus may be readily adjusted to form tubing having the desired size and shape. Furthermore, it is seen that the present invention has provided an apparatus which is capable of forming the corrugated tubing relatively rapidly and accurately.

While the preferred embodiment of the present invention has been shown and described herein, it is obvious that many structural details may be changed without departing from the spirit and scope of the appended claims.

The invention is claimed as follows:

1. An apparatus for making corrugated tubing comprising means for forming annular grooves in a length of tubing, means for initially feeding the tubing intermittently to said groove forming means, said feeding means including means for starting, feeding and stopping the tubing to insure accurate spacing of grooves in the tubing, means adjacent said groove forming means for axially collapsing portions of the tubing between grooves and for feeding tubing, means for rendering said first mentioned feeding means inoperable after the tubing has been advanced to said collapsing and feeding means, and means for operating said feeding means, said grooving means and said collapsing and feeding means in predetermined timed relationship.

2. An apparatus for making corrugated tubing comprising means for forming annular grooves in a length of tubing, means for initially feeding the tubing intermittently to said groove forming means, said feeding means including means for positively starting, feeding and stopping the tubing to insure accurate spacing of grooves in the tubing, means for positively locking said feeding means against movement while the grooving means is forming a groove in the tubing, means adjacent said groove forming means for axially collapsing portions of the tubing between grooves and for feeding the tubing, means for rendering said first mentioned feeding means inoperable after the tubing has been advanced to said collapsing and feeding means, and means for operating said feeding means, said grooving means and said collapsing and feeding means in timed relationship.

3. An apparatus for making corrugated tubing comprising means for forming annular grooves in a length of tubing, means for initially feeding the tubing intermittently to said groove forming means, said feeding means including means for positively starting, feeding and stopping the tubing to insure accurate spacing of the grooves in the tubing, relatively easily adjustable means for changing the length of each intermittent feeding movement of said feeding means to vary the spacing of the grooves, means adjacent said groove forming means for axially collapsing portions of the tubing between the grooves and for feeding the tubing, means for rendering said first mentioned feeding means inoperable after the tubing has been advanced to said collapsing and feeding means, and means for operating said feeding means, said groove forming means and said collapsing and feeding means in predetermined timed relationship.

4. An apparatus for making corrugated tubing comprising means for forming annular grooves in a length of tubing, means for initially feeding the tubing intermittently to said groove forming means, said feeding means including releasable clamping means for gripping the tubing and means for positively starting, feeding and stopping said clamping means to insure accurate spacing of grooves in the tubing, means adjacent said groove forming means for axially collapsing portions of the tubing between grooves and for feeding the tubing, means for operating said clamping means to release the tubing after the tubing has been advanced to said collapsing and feeding means, and means for operating said feeding means, said groove forming means and said collapsing and feeding means in predetermined timed relationship.

5. An apparatus for making corrugated tubing comprising means for forming annular grooves in a length of tubing, means for initially feeding the tubing intermittently to said groove forming means, means adjacent said groove forming means for axially collapsing portions of the tubing between grooves and for feeding the tubing, means for rendering said first mentioned feeding means inoperative after the tubing has been advanced to the collapsing and feeding means, said collapsing and feeding means having a predetermined axial stroke including a feeding portion and a combined collapsing and feeding portion, means for adjusting said collapsing and feeding means to individually change the length of one of said stroke portions without changing the length of the other of said stroke portions, and means for operating said feeding means, said groove forming means and said collapsing and feeding means in predetermined timed relationship.

6. An apparatus for making corrugated tubing comprising means for forming annular grooves in a length of tubing, means for initially feeding the tubing intermittently to said groove forming means, means adjacent said groove forming means for axially collapsing portions of the tubing between grooves and for feeding the tubing, means for rendering said first mentioned feeding means inoperative after the tubing has been advanced to the collapsing and feeding means, said collapsing and feeding means including die means mounted for reciprocating movement axially of the tubing, linkage means for reciprocating said die means with a stroke of predetermined length having a feeding portion and a combined collapsing and feeding portion, means for adjusting said linkage means to individually change the length of either of said stroke portions without changing the length of the other of said stroke portions, and means for operating said feeding means, said groove forming means, and said collapsing and feeding means in predetermined timed relationship.

7. An apparatus, as defined in claim 6, wherein said collapsing and feeding means includes additional die means adapted to be adjusted axially of the tubing and fixed for cooperation with said first mentioned die means, and wherein said adjusting means is operable to change the overall length of the reciprocable die means stroke.

8. An apparatus, as defined in claim 7, which includes readily adjustable means for varying the intermittent feeding movement of said first mentioned feeding means.

9. An apparatus for making corrugated tubing comprising means for forming annular grooves in a length of tubing, means for initially feeding the tubing intermittently to said groove forming means, means adjacent said groove forming means including reciprocable die means for collapsing axially portions of the tubing between grooves and for feeding the tubing, means for rendering said first mentioned feeding means inoperative after the tubing has been advanced to the collapsing and feeding means, a plurality of linkage means for successively moving said reciprocable die means, relatively high speed cam means for successively actuating each of said linkage means, and means for operating said first mentioned feeding means, said groove forming means and said high speed cam means in predetermined timed relationship.

10. In an apparatus for making corrugated tubing a combination comprising means for forming annular grooves in a length of tubing, and means for feeding the tubing intermittently to said groove forming means, said feeding means including means for positively starting, feeding and stopping the tubing to insure accurate spacing of grooves in the tubing at predetermined intervals, readily adjustable gear means adapted to vary the feeding movement of the tubing to change the spacing between the grooves in the tubing by relatively small increments, means including reciprocable die means for collapsing axially portions of the tubing between the grooves and for feeding the tube, means for rendering said first mentioned feeding means inoperative after the tube has been advanced to said collapsing and feeding means, and means for operating said first mentioned feeding means, said groove forming means and said collapsing and feeding means in timed relationship.

11. An apparatus for making corrugated tubing comprising means for forming annular grooves in a length of tubing, and means for feeding the tubing intermittently to said groove forming means, said feeding means including a releasable clamp adapted to grip the tubing, means for positively starting, feeding and stopping said clamp and the tubing gripped thereby to insure accurate spacing of grooves in the tubing, means including reciprocable die means for collapsing axially portions of the tubing between the grooves and for feeding the tube, means for rendering said first mentioned feeding means inoperative after the tube has been advanced to said collapsing and feeding means, and means for operating said first mentioned feeding means, said groove forming means and said collapsing and feeding means in timed relationship.

12. An apparatus, as defined in claim 11, wherein said means for feeding said clamp includes a rotatably supported feed screw, adjustable nut means connected with said clamp, and means operable to move said nut means into cooperative engagement with said feed screw to feed said clamp, said last mentioned means also being operable to disengage said nut means from said feed screw in order to terminate the feeding of said clamp.

13. In an apparatus for making corrugated tubing comprising die means engageable with the tubing, additional die means for gripping the tubing and mounted for reciprocable movement axially of the tubing to feed the tubing and to collapse the tubing in cooperation with said first mentioned die means, said reciprocable die means having a predetermined stroke including a feeding portion and a combined collapsing and feeding portion, a plurality of linkage means for successively actuating said reciprocable die means, means for adjusting said linkage means individually to change the length of one of said stroke portions without changing the length of the other of said stroke portions, and relatively high speed cam means for operating said linkage means.

14. In an apparatus for making corrugated tubing from tubing stock having a series of annular grooves formed therein, means for axially collapsing, portions of the tubing between grooves and for axially feeding the tubing, said means having a predetermined stroke including a feeding portion and a combined collapsing and feeding portion, and means for adjusting said collapsing and feeding means individually to change the length of one of said stroke portions without changing the length of the other of said stroke portions.

15. In an apparatus for making corrugated tubing from tubing stock having a series of spaced annular grooves therein, means for axially collapsing portions of the tubing between grooves and for axially feeding the tubing, said means including axially stationary die means and cooperating axially reciprocable die means, linkage means for moving said reciprocable die means through a stroke having a feeding portion and a combined collapsing and feeding portion, and means for adjusting said linkage means individually to change the length of either of said stroke portions without changing the length of the other of said stroke portions.

16. In an apparatus for making corrugated tubing from tubing stock having a series of spaced annular grooves therein, means for axially collapsing portions of the tubing between grooves and for axially feeding the tubing, said means including stationary die means and cooperating reciprocable die means, linkage means for moving said reciprocable die means through a tubing feeding stroke portion, additional linkage means for moving said reciprocable die means through a combined tubing collapsing and feeding stroke portion, and means for adjusting each of said linkage means separately from each other to change the relative lengths of said stroke portions while permitting the length of one of said stroke portions to remain constant.

17. An apparatus, as defined in claim 16, wherein said feeding stroke portion and said combined feeding and collapsing stroke portion provide a complete stroke extending from a predetermined starting position, and wherein said means for adjusting each of said linkage means is operable without changing said starting position.

References Cited in the file of this patent

UNITED STATES PATENTS

| | | |
|---|---|---|
| 700,662 | Koffler | May 20, 1902 |
| 928,254 | Gail | July 20, 1909 |
| 1,605,194 | Kopf | Nov. 2, 1926 |
| 2,027,018 | Brinkman | Jan. 7, 1936 |
| 2,092,873 | Brinkman | Sept. 14, 1937 |
| 2,139,714 | Benson | Dec. 13, 1938 |
| 2,176,188 | Poole et al. | Oct. 17, 1939 |
| 2,669,278 | Anderson | Feb. 16, 1954 |